United States Patent
Shi

(10) Patent No.: US 12,200,582 B2
(45) Date of Patent: Jan. 14, 2025

(54) METHOD AND DEVICE FOR MANAGING DATA, AND COMPUTER PROGRAM PRODUCT

(71) Applicant: PATEO CONNECT+ TECHNOLOGY (SHANGHAI) CORPORATION, Shanghai (CN)

(72) Inventor: Hongren Shi, Shanghai (CN)

(73) Assignee: PATEO CONNECT+ TECHNOLOGY (SHANGHAI) CORPORATION, Shanghai (CN)

( * ) Notice: Subject to any disclaimer, the term of this patent is extended or adjusted under 35 U.S.C. 154(b) by 311 days.

(21) Appl. No.: 17/763,669

(22) PCT Filed: Dec. 9, 2019

(86) PCT No.: PCT/CN2019/124068
§ 371 (c)(1),
(2) Date: Mar. 25, 2022

(87) PCT Pub. No.: WO2021/056831
PCT Pub. Date: Apr. 1, 2021

(65) Prior Publication Data
US 2022/0248195 A1    Aug. 4, 2022

(30) Foreign Application Priority Data

Sep. 25, 2019   (CN) .......................... 201910911296.5

(51) Int. Cl.
*H04W 4/44*     (2018.01)
*B60W 60/00*    (2020.01)
(Continued)

(52) U.S. Cl.
CPC ........ *H04W 4/44* (2018.02); *B60W 60/00253* (2020.02); *G01C 21/3484* (2013.01);
(Continued)

(58) Field of Classification Search
CPC ....... H04W 4/44; H04W 4/024; H04W 4/029; B60W 60/00253; B60W 2556/50;
(Continued)

(56) References Cited

U.S. PATENT DOCUMENTS 5,936,631 A * 8/1999 Yano .................... G09B 29/106
701/428
2009/0222587 A1   9/2009 Ahn et al.
(Continued)

FOREIGN PATENT DOCUMENTS

CN    102595316    7/2012
CN    103424121    12/2013
(Continued)

OTHER PUBLICATIONS

Chinese Office Action (Application No. 201910911296.5) mailed Dec. 5, 2022.
(Continued)

*Primary Examiner* — Rodney A Butler
(74) *Attorney, Agent, or Firm* — NIXON PEABODY LLP; Jeffrey L. Costellia

(57) ABSTRACT

A method (200) and device (500) for managing data and a computer program product, wherein the method (200) comprises: acquiring data related to a schedule of a user (101) at a mobile terminal device (102). The method (200) further comprises: identifying the data to obtain a travel time related to the user (101) and location information corresponding to the travel time. The method (200) further comprises: sending a transmission request related to the travel time and the location information to a server (103), so that the server (103) sends the travel time and the location information to a vehicle (104) related to an identification of user of the user
(Continued)

(101), wherein the transmission request at least comprises the identification of user, the travel time and the location information.

17 Claims, 5 Drawing Sheets

(51) Int. Cl.
| | | |
|---|---|---|
| *G01C 21/34* | (2006.01) | |
| *G06Q 10/10* | (2023.01) | |
| *G06Q 10/1093* | (2023.01) | |
| *G06Q 50/40* | (2024.01) | |
| *H04M 1/72* | (2021.01) | |
| *H04M 1/72451* | (2021.01) | |
| *H04W 4/02* | (2018.01) | |
| *H04W 4/024* | (2018.01) | |

(52) U.S. Cl.
CPC ......... *G06Q 10/1093* (2013.01); *G06Q 50/40* (2024.01); *H04M 1/72451* (2021.01); *H04W 4/024* (2018.02); *B60W 2556/50* (2020.02)

(58) Field of Classification Search
CPC ............ G01C 21/3484; G01C 21/3608; G01C 21/362; G06Q 10/1093; G06Q 50/40; G06Q 10/025; G06Q 10/0631; G06Q 10/109; G06Q 30/06; G06Q 50/10; H04M 1/72451; H04L 67/12; H04L 67/141; H04L 67/52
See application file for complete search history.

(56) References Cited

U.S. PATENT DOCUMENTS

| | | |
|---|---|---|
| 2013/0151149 A1 | 6/2013 | Kristinsson et al. |
| 2016/0156773 A1 | 6/2016 | Chanda |
| 2017/0028949 A1 | 2/2017 | Nelson et al. |
| 2017/0126837 A1 | 5/2017 | Wang et al. |
| 2019/0056229 A1 | 2/2019 | Sarkar et al. |
| 2019/0361754 A1* | 11/2019 | Breijo Baullosa ...... G06F 16/34 |

FOREIGN PATENT DOCUMENTS

| | | |
|---|---|---|
| CN | 103824467 | 5/2014 |
| CN | 104883382 | 9/2015 |
| CN | 106412206 | 2/2017 |
| CN | 108205711 | 6/2018 |
| CN | 108205711 A | 6/2018 |
| CN | 108389418 | 8/2018 |
| CN | 109323707 | 2/2019 |
| CN | 109859510 | 6/2019 |
| CN | 110146105 | 8/2019 |
| WO | 2017166648 A1 | 10/2017 |

OTHER PUBLICATIONS

Extended European Search Report for Application No. 19946888.5, mailed Oct. 4, 2023 (14 pages).
International Search Report for PCT/CN2019/124068, mailed Jun. 28, 2020, (6 pages).
Chinese Office Action for 201910911296.5, mailed Sep. 1, 2021. (5 pages).
Chinese Office Action for 201910911296.5, mailed Mar. 3, 2022, (6 pages).

* cited by examiner

METHOD AND DEVICE FOR MANAGING DATA, AND COMPUTER PROGRAM PRODUCT

TECHNICAL FIELD

The embodiments of the present disclosure relate to the field of managing data, and particularly to a method and a device for managing data, and a computer program product.

BACKGROUND

With the development of technology, multiple applications applied to mobile terminal devices (such as mobile phones) have been developed. By using applications on the mobile terminal devices, users can easily solve problems encountered in a plurality of real scenes. For example, travel applications developed at present have solved car-hailing problems of users.

With the development of technology, multiple applications that can interact with vehicles have been developed at present. Through these applications involving vehicles, problems of users about using vehicles and traveling are solved. Although these applications have been used by a plurality of users, these applications still have a plurality of problems to be solved.

In the traditional solution of managing data, the user usually enters a destination address through a map application of the mobile phone to start navigation or enter the destination address into a navigation system of the vehicle for navigation, which cannot share travel data, wastes the time of the user and reduces the utilization rate of data resources.

SUMMARY

The embodiments of the present disclosure provide a method and a device for managing data, and a computer program product, which can share travel data between a vehicle and a mobile phone.

According to a first aspect of the present disclosure, a method for managing data is provided. The method comprises: acquiring data related to a schedule of a user at a mobile terminal device. The method also comprises: identifying the data to obtain a travel time related to the user and location information corresponding to the travel time. The method also comprises: sending a transmission request related to the travel time and the location information to a server, so that the server sends the travel time and the location information to a vehicle related to an identification of the user, wherein the transmission request at least comprises the identification of user, the travel time and the location information.

According to a second aspect of the present disclosure, a method for managing data is provided. The method comprises: receiving a transmission request related to a travel time and location information of a user from a mobile terminal device at a server, wherein the transmission request at least comprises an identification of user, the travel time, and the location information. The method also comprises: based on the identification of user, determining whether the user corresponding to the identification of user exists. The method also comprises: in response to determine that the user corresponding to the user identifier exists, storing the travel time and the location information. The method also comprises: in response to receive a connection request including an identification of user from a vehicle, sending the travel time and the location information related to the identification of user to the vehicle, so that the vehicle initiates automatic navigation based on the travel time and the location information.

According to a third aspect of the present disclosure, a method for managing data is provided. The method comprises: sending a connection request including an identification of user to a server at a vehicle. The method also comprises: receiving a travel time and location information corresponding to the identification of user from the server. The method also comprises: based on the travel time, initiating automatic navigation related to the location information.

According to a fourth aspect of the present disclosure, an electronic device for managing data is provided. The electronic device comprises a processor; and a memory storing a computer program, wherein the processor runs the computer program instruction in the memory to control the electronic device to execute actions. The actions include: acquiring data related to a schedule of a user; identifying the data to obtain a travel time related to the user and location information corresponding to the travel time; and sending a transmission request related to travel time and the location information to a server, so that the server sends the travel time and the location information to a vehicle related to an identification of the user, wherein the transmission request at least comprises the identification of user, the travel time and the location information.

According to a fifth aspect of the present disclosure, an electronic device for managing data is provided. The electronic device comprises a processor; and a memory storing a computer program, wherein the processor runs the computer program instruction in the memory to control the electronic device to execute actions. The actions include: receiving a transmission request related to a travel time and location information of a user from a mobile terminal device, wherein the transmission request at least comprises an identification of user, the travel time, and the location information; based on the identification of user, determining whether the user corresponding to the identification of user exists; in response to determining that the user corresponding to the identification of user exists, storing the travel time and the location information; and, in response to receiving a connection request including the identification of user from a vehicle, sending the travel time and the location information related to the identification of user to the vehicle, so that the vehicle initiates automatic navigation based on the travel time and the location information.

According to a sixth aspect of the present disclosure, an electronic device for managing data is provided. The electronic device comprises a processor; and a memory storing a computer program, wherein the processor runs the computer program instruction in the memory to control the electronic device to execute actions. The actions include: sending a connection request including an identification of user to a server; receiving a travel time and location information corresponding to the identification of user from the server; and, based on the travel time, initiating automatic navigation related to the location information.

According to a seventh aspect of the present disclosure, a computer program product is provided, wherein the computer program product is tangibly stored on a non-volatile computer-readable medium and comprises a machine-executable instruction that, when executed, causes a machine to perform the steps of the method in the first aspect of the present disclosure.

According to an eighth aspect of the present disclosure, a computer program product is provided, wherein the computer program product is tangibly stored on a non-volatile computer-readable medium and comprises a machine-executable instruction that, when executed, causes a machine to perform the steps of the method in the second aspect of the present disclosure.

According to a ninth aspect of the present disclosure, a computer program product is provided, wherein the computer program product is tangibly stored on a non-volatile computer-readable medium and comprises a machine-executable instruction that, when executed, causes a machine to perform the steps of the method in the third aspect of the present disclosure.

BRIEF DESCRIPTION OF THE DRAWINGS

Through the more detailed description of the embodiments of the present disclosure in conjunction with the drawings, the above and other objectives, features, and advantages of the present disclosure will become more apparent. In the embodiments of the present disclosure, the same reference numerals generally represent the same components.

In each drawing, the same or corresponding symbols represent the same or corresponding parts.

DETAILED DESCRIPTION OF THE EMBODIMENTS

Figure 1:
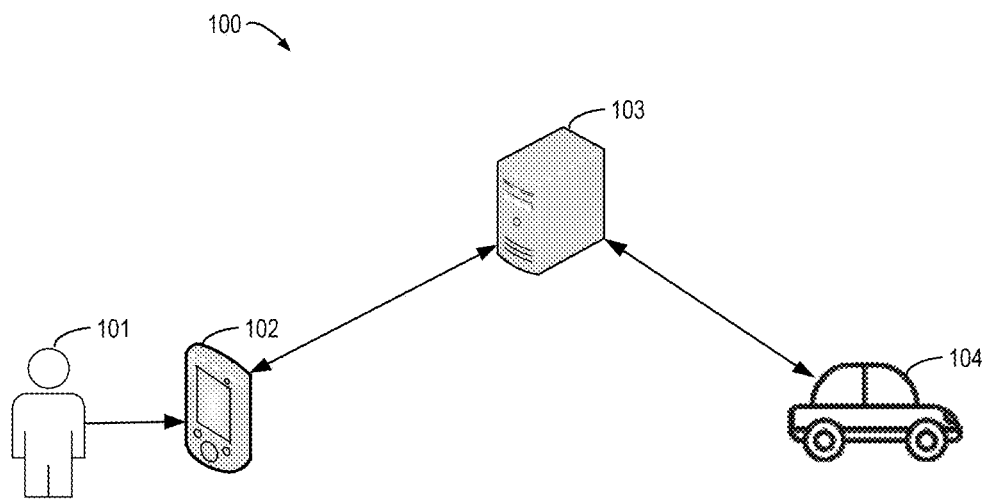
FIG. 1 illustrates a schematic diagram of an environment 100 in which a device and/or method according to an embodiment of the present disclosure may be implemented.

The embodiments of the present disclosure will be described in further detail hereinafter with reference to the drawings. Although some embodiments of the present disclosure are shown in the drawings, it should be understood that the present disclosure may be embodied in various forms and should not be construed as limited to the embodiments set forth herein. On the contrary, these embodiments are provided for a more thorough and complete understanding of the present disclosure. It should be understood that the drawings and the embodiments of the present disclosure are only for exemplary purposes, and are not intended to limit the scope of protection of the present disclosure.

In the description of the embodiments of the present disclosure, the term "including" and similar terms thereof should be understood as open inclusion, that is, "including but not limited to". The term "based on" should be understood as "at least partly based on". The term "one embodiment" or "this embodiment" should be understood as "at least one embodiment". The terms "first", "second", or the like, may refer to different or identical objects. Other explicit and implicit definitions may be probably included below.

The principle of the present disclosure will be described hereinafter with reference to a plurality of exemplary embodiments shown in the drawings. Although the preferred embodiments of the present disclosure are shown in the drawings, it should be understood that these embodiments are described only for those skilled in the art to better understand and further realize the present disclosure, and do not limit the scope of the present disclosure in any way.

Usually, when a user wants to go to a location or plans to go to a predetermined location, the user will not do any processing on the location information. When traveling on that day, after the user enters a vehicle, the user enters a destination address through a map application of a mobile phone to start navigation or enters the destination address into a navigation system of the vehicle for navigation. However, this way makes it necessary for the user to manually input the travel destination when traveling, which makes it impossible to share travel data between the vehicle and the mobile phone, and wastes the time of the user and reduces a utilization rate of data resources.

To at least solve some problems of the prior art, the embodiments of the disclosure provide a method for managing data. The method acquires data related to a schedule of a user at a mobile terminal device; and then identifies the data to obtain a travel time related to the user and location information corresponding to the travel time. The mobile terminal device may send the information to a server, and then the server forwards the information to a vehicle to realize automatic navigation of the vehicle. With the above method, the time wasted by the user having to manually input the travel destination can be reduced, so that the vehicle and the mobile phone can share the travel data, and the data processing efficiency and the resource utilization rate are improved.

FIG. 1 illustrates a schematic diagram of an environment 100 in which a device and/or method according to the embodiments of the present disclosure may be implemented. The environment 100 may include a mobile terminal device 102, a server 103, and a control device (not specifically shown) in a vehicle 104. The mobile terminal device 102, the server 103, and the control device in the vehicle 104 may perform data interaction. In some embodiments, the environment 100 may be an IoV (Internet of Vehicles) environment.

The mobile terminal device 102 comprises but is not limited to a mobile phone, a personal digital assistant (PDA), a medium player, a handheld or laptop device, a minicomputer, a wearable device, and the like.

Applications may be run on the mobile terminal device 102. The mobile terminal device 102 may be configured with sensor components such as a speech recognition component and an image recognition component.

In some embodiments, the mobile terminal device 102 can recognize a voice input by a user 101 and recognize a travel time of the user and location information of a destination that the user 101 wants to go from voice data input by the user 101. The location information may be a destination name or coordinate information. For example, the user says that he will arrive at InterContInental Hotels on August 9th, and have dinner at "Thousand Island Big Fish Head" in the evening. On the second day, the user will go to Fisherman's Wharf, rent a bike and ride around the lake; and then go to "Thousand Island Farmhouse" for dinner. Through speech recognition, the travel time August 9th, and the corresponding location including InterContInental Hotels can be extracted; on the evening of August 9th, the corresponding location information is Thousand Island Big Fish Head; and the second day (August 10th), and the corresponding location information including Fisherman's Wharf and Thousand Island Farmhouse can be also extracted.

In some embodiments, the mobile terminal device 102 can recognize images. The travel time and the location information of the user 101 are acquired by recognizing the images. For example, the travel time written by the user 101 and the location information of the destination that the user 101 wants to go to can be identified.

In some embodiments, the mobile terminal device 102 can scan a short message of the mobile terminal device 102 to obtain the travel time of the user 101 and the location information of the destination that the user 101 wants to go to.

The server 103 comprises but is not limited to a personal computer, a server computer, a handheld or laptop device, a multiprocessor system, a consumer electronic product, a minicomputer, a mainframe computer, a distributed computing environment including any of the above systems or devices, and the like. In some embodiments, the server 103 is implemented with a platform for managing the information of the user 101 and the vehicle. In some embodiments, the server 103 is a part of the platform for managing the information of the user and the vehicle. For example, the server 103 is a part of an IOV environment.

The mobile terminal device 102 may send the obtained travel time of the user 101 and the location information of the destination corresponding to the travel time to the server 103. The server 103 may manage the travel time of the user 101 and the location information corresponding to the travel time.

The environment 100 also comprises the vehicle 104 and the control device therein. The vehicle 104 refers to any vehicle or other object that can receive information and can travel. However, it should be understood that this is for the purpose of example only and is not intended to limit the scope of the present disclosure.

The vehicle 104 may receive information from the server 103. In some embodiments, the control device in the vehicle 104 runs an application, and may send identification of user information of the application to the server 103. Alternatively or additionally, the application running in the vehicle 104 should be the same application as the application running in the mobile terminal device 102. If the identification of user information exists in the server 103, the server 103 may send the travel time and the location information corresponding to the user 101 to the vehicle 104, so that the vehicle 104 can determine whether to initiate automatic navigation based on a current time and the travel time.

The schematic diagram of the example environment 100 for managing data according to the embodiments of the present disclosure is described above in conjunction with FIG. 1. A schematic diagram of an example method 200 for managing data according to the embodiments of the present disclosure is described in detail below in conjunction with FIG. 2. For example, the method 200 may be performed by the mobile terminal device 102 as shown in FIG. 1. Each action of the method 200 will be described in detail below with reference to FIG. 1. It should be understood that the method 200 may also include additional actions not shown and/or the illustrated actions may be omitted. The scope of the present disclosure is not limited in this respect.

At box 202, the mobile terminal device 102 acquires data related to a schedule of a user 101. An application running in the mobile terminal device 102 may use some components or functions of the mobile terminal device 102 to acquire the data related to the schedule of the user 101.

In some embodiments, the mobile terminal device 102 acquires voice data input by the user 101 at the mobile terminal device 102. The voice data is data input by the user and related to the schedule.

In some embodiments, the mobile terminal device 102 acquires image data related to the schedule of the user 101, and the image data comes from at least one of the mobile terminal device 102 and a server 103. For example, the user 101 uses the mobile terminal device 102 to photograph travel information handwritten by the user 101.

In some embodiments, the mobile terminal device 102 acquires a short message (for example, a short message in a mobile phone) on the mobile terminal device 102. If the user 101 has booked a movie theater, a hotel, a restaurant, a hotel, or the like, the user usually receives a short message about reservation information of the above places.

At box 204, the mobile terminal device 102 identifies the data to obtain a travel time related to the user 101 and location information corresponding to the travel time. After the mobile terminal device 102 obtains the travel data of the user 101, the travel time and the location information of the user 101 can be obtained by processing the above data.

In some embodiments, if the mobile terminal device 102 obtains voice data from the user, the travel time of the user 101 and the location information corresponding to the travel time are obtained by recognizing the voice data. The location information may either be a destination name or a destination coordinate.

In some embodiments, if the mobile terminal device 102 obtains image data, image recognition may be performed on the image data to obtain the travel time and the location information.

In some embodiments, if the mobile terminal device 102 obtains a short message, the short message may be scanned to obtain the travel time and the location information. For example, address and time information such as a movie theater, a hotel, a restaurant, a hotel or the like reserved by user may be obtained by scanning the short message. If the users book a hotel, the travel time and a hotel address may be automatically acquired by scanning.

At box 206, the mobile terminal device sends a transmission request related to the travel time and the location information to the server 103, so that the server 103 sends the travel time and the location information to a vehicle related to an identification of the user, wherein the transmission request at least comprises the identification of user, the travel time and the location information.

After the mobile terminal device 102 obtains the travel time and the location information of the user 101, the mobile terminal device 102 may transmit the travel time and the location information obtained to the server 103. The server 103 may manage the travel time and the location information of the user 101. If the user 101 is in the vehicle 104, for example, when the user 101 sends a request for acquiring the schedule of the user to the server 103 through an application in the vehicle 104, the server 103 may send the schedule information (for example, the travel time and the location information) of the user 101 to the vehicle 104, so that the vehicle 104 can initiate automatic navigation based on a current time and the travel time.

With the above method, the travel time and the location information obtained by the mobile terminal device are transmitted to the vehicle through the server, so that the time wasted by the user having to manually input the travel destination can be reduced, the resource utilization rate is improved, and the data processing efficiency is also improved.

In some embodiments, the mobile terminal device 102 also stores the location information based on the travel time. Alternatively or additionally, the mobile terminal device 102 stores the location information in a calendar based on the travel time. For example, that mobile terminal device 102 store the travel time and the location information obtained in a calendar of a predetermined application of the mobile terminal device 102.

In some embodiments, the mobile terminal device 102, when confirming that a current time is matched with the travel time, will display a prompt message related to the location information to the user 101. For example, when the travel time stored in the mobile terminal device 102 is matched with the current time, the mobile terminal device 102 may display the prompt message including automatic navigation information or car hailing service information to the user 101. If the user 101 does not drive a car, the mobile terminal device 102 may display whether to hail a car for the user 101. If the user 101 needs to hail a car, a car hailing service to the location can be directly performed.

In some embodiments, the user 101 may perform a query operation at the mobile terminal device 102, such as time query and location query.

In some embodiments, when a first query request including the query time is received, that is, when the user inputs the query time, the mobile terminal device 102 determines whether location information corresponding to the query time exists, and if it is determined that the location information related to the query time exists, displays the location information corresponding to the query time to the user. For example, if the user inputs a date or clicks a certain day in the calendar, the date or location information related to the date will be displayed to the user. Alternatively, or additionally, when the location information is displayed, a query date is also displayed together.

In some embodiments, when a second query request including query location information is received, that is, when the user inputs the query location, the mobile terminal device 102 determines whether a travel time related to the query location information exists; and if the travel time related to the query location information exists, displays the travel time to the user. Alternatively or additionally, when the time is displayed, a query location is also displayed together.

In the above method, the user can quickly and conveniently obtain information at the mobile terminal device, which reduces the wasted time and improves the information processing efficiency.

To facilitate the management of travelled location information and untraveled location information, the mobile terminal device 102 may use different marks to identify the travelled location information and the untraveled location information. For example, in the calendar, a first display setting is used to display travelled location information, and another display setting is used to display the untraveled location information.

Figure 2:
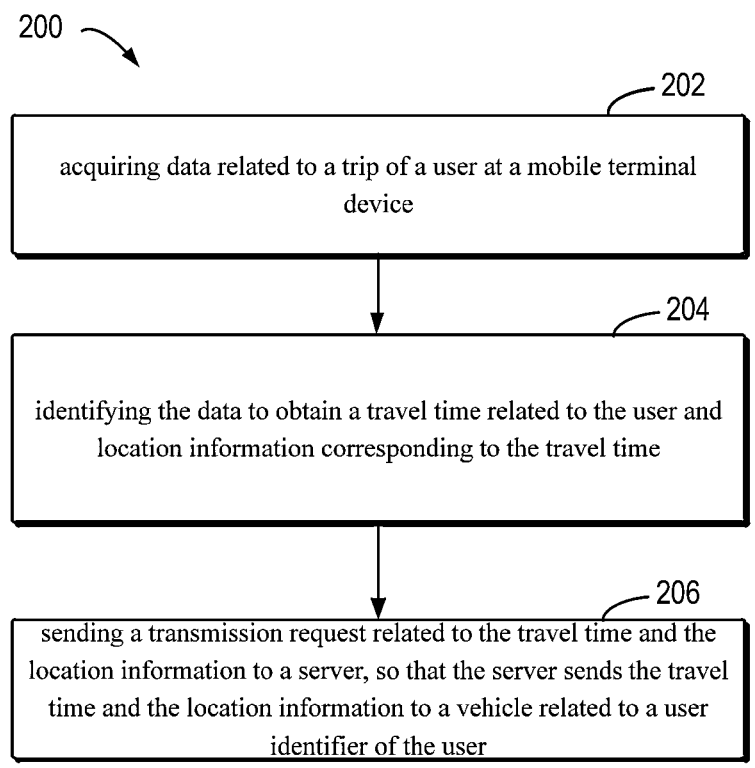
FIG. 2 illustrates a flow chart of steps of a method 200 for managing data according to an embodiment of the present disclosure.

The schematic diagram of the example method 200 for managing data according to the embodiments of the present disclosure is described in detail above in conjunction with FIG. 2. A flow chart of an example method 300 for managing data at a server according to the embodiments of the present disclosure is described in detail below in conjunction with FIG. 3. For example, the method 300 may be performed by the server 103 as shown in FIG. 1. Each action of the method 300 will be described in detail below with reference to FIG. 1. It should be understood that the method 300 may also include additional actions not shown and/or the illustrated actions may be omitted. The scope of the present disclosure is not limited in this respect.

At box 302, the server 103 receives a transmission request related to a travel time and location information of a user 101 from a mobile terminal device 102, wherein the transmission request at least comprises an identification of user, the travel time, and the location information. After the mobile terminal device 102 obtains the travel time and the location information of the user, the mobile terminal device 102 may transmit these information obtained to the server 103 to manage the travel time and the location information of the user 101.

At box 304, the server 103, based on the identification of user, determines whether the user 101 corresponding to the identification of user exists. After receiving the transmission request from the mobile terminal, the server 103 will check whether the identification of the user 101 exists on the server 103.

If the server 103 determines that the user 101 corresponding to the identification of user exists, the server 103 will store the travel time and the location information at box 306.

At box 308, the server 103 will check whether a connection request including the identification of user is received from the vehicle 104. In some embodiments, when the user 101 opens an application in the vehicle 104, the vehicle 104 will send the connection request including the connection request to the server to obtain information about the user.

When the server 103 receives the connection request from the vehicle 104, the server 103 sends the travel time and the location information related to the identification of user to the vehicle 104 at box 310, so that the vehicle 104 initiates automatic navigation based on the travel time and the location information.

When the vehicle 104 receives the travel time and the location information of the user from the server 103, the travel time and the location information may be recorded in the calendar for the user to view.

With the above method, the server may send the travel time and the location information obtained from the mobile terminal device to the vehicle, so that the vehicle can automatically initiate navigation. The time for the user to initiate navigation is saved, and the data processing efficiency is improved.

Figure 3:
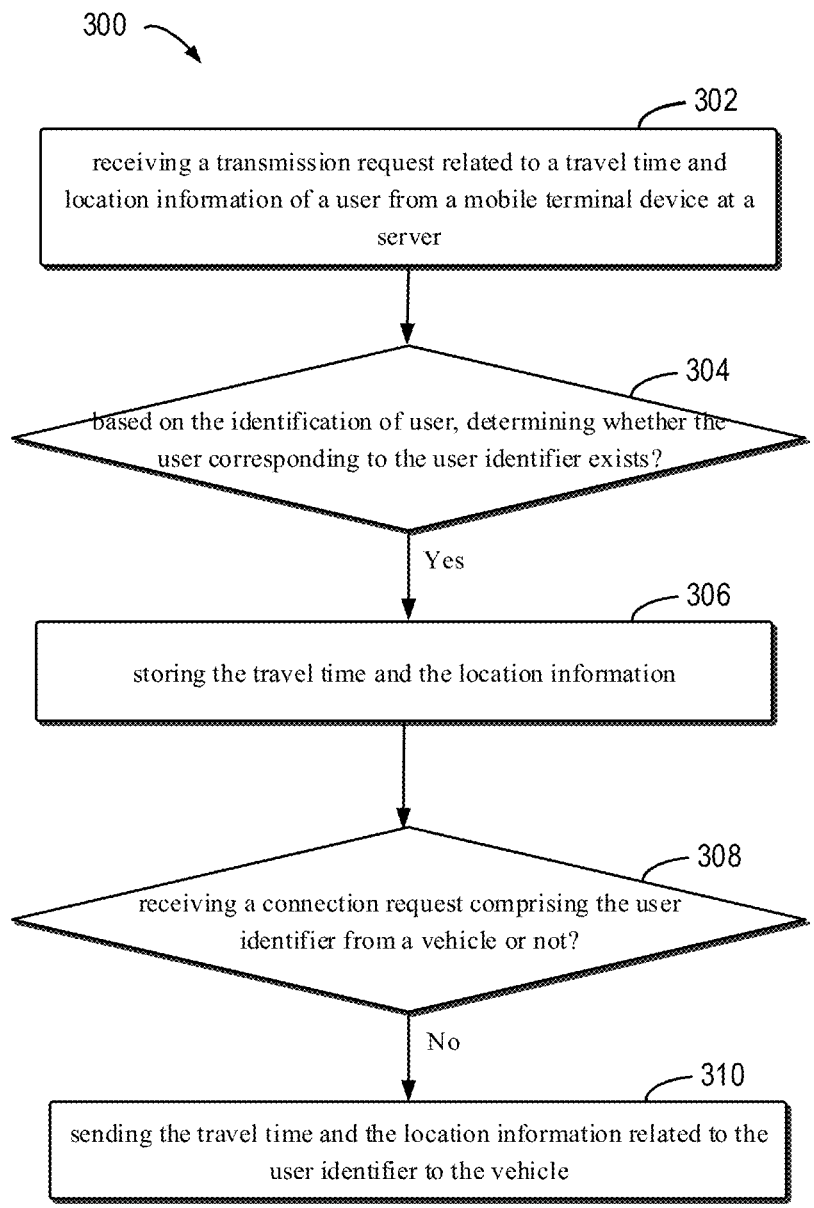
FIG. 3 illustrates a flow chart of steps of a method 300 for managing data according to an embodiment of the present disclosure.
Figure 4:
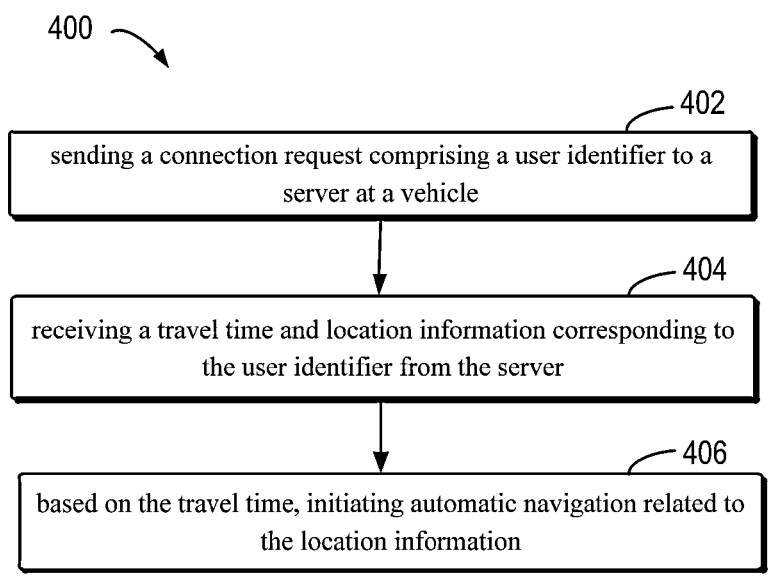
FIG. 4 illustrates a flow chart of steps of a method 400 for managing data according to an embodiment of the present disclosure.

The schematic diagram of the example method 300 for managing data according to the embodiments of the present disclosure is described in detail above in conjunction with FIG. 3. A flow chart of an example method 400 for managing data according to the embodiments of the present disclosure is described in detail below in conjunction with FIG. 4. For example, the method 400 may be performed by a control device in a vehicle 104 as shown in FIG. 1. Each action of the method 400 will be described in detail below with reference to FIG. 1. It should be understood that the method 400 may also include additional actions not shown and/or the illustrated actions may be omitted. The scope of the present disclosure is not limited in this respect.

At box 402, the vehicle 104 sends a connection request including an identification of user to a server 103. In some embodiments, after the user 101 enters the vehicle 104, if an application on the mobile terminal device 102 for managing a schedule of the user is used on the vehicle 104, the application on the vehicle 104 will cause the vehicle 104 to send a connection request to the server 103. The connection request comprises an identification of a user of a user 101.

At box 404, the vehicle 104 receives a travel time and location information corresponding to the identification of user from the server 103. After verifying the identification of user, the server 103 will send the travel time and the location information corresponding to the user 101 to the vehicle 104.

At box 406, the vehicle 104, based on the travel time, initiates automatic navigation related to the location information. After obtaining the travel time and the location information of the user, the vehicle 104 will detect a relationship between the travel time and a current time, and then initiate automatic navigation according to the location information.

In some embodiments, in response to confirming that the current time is matched with the travel time, information for navigation is generated based on a current location of the vehicle 104 and location information corresponding to the travel time.

With the above method, the vehicle can automatically initiate navigation based on the travel time and the location information obtained from the server. Through the automatic acquisition of data, the time for the user to set up navigation in the vehicle is reduced, and the travel efficiency of the vehicle is improved.

Figure 5:
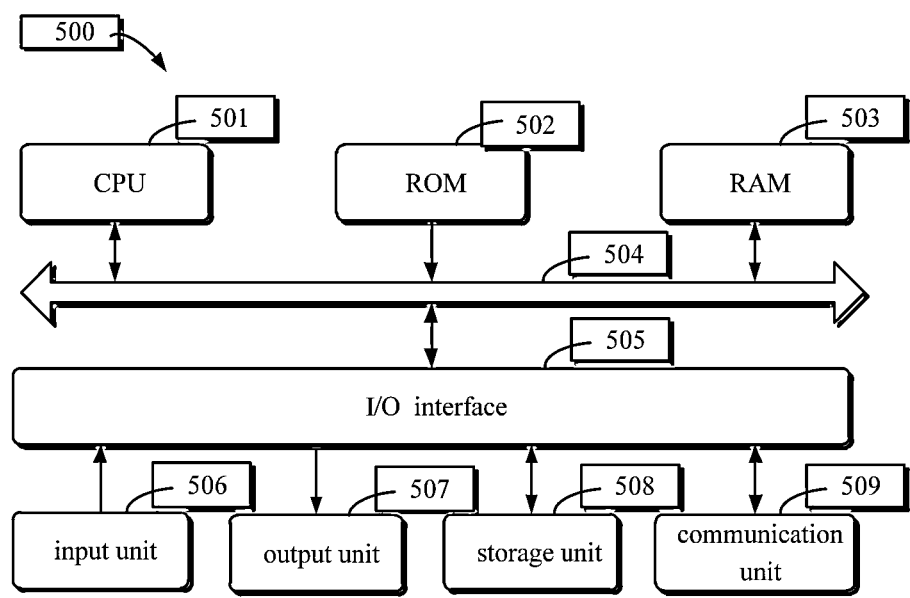
FIG. 5 illustrates a schematic block diagram of an example device 500 suitable for implementing the embodiments of the present disclosure.

FIG. 5 illustrates a schematic block diagram of an example device 500 which may be used for implementing the embodiments of the present disclosure. For example, any one of a mobile terminal device 102, a server 103 and a control device in a vehicle 104 as shown FIG. 1 can be implemented by the device 500. As shown in the figure, the device 500 comprises a central processing unit (CPU) 501, which can perform various appropriate actions and processes according to a computer program instruction stored in a read-only memory (ROM) 502 or loaded from a storage unit 508 into a random access memory (RAM) 503. In the RAM 503, various programs and data needed for operating the device 500 may also be stored. The CPU 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, for example, when the device 500 implements the mobile terminal device 102 and the server 103, the input unit 506 may be a keyboard, a mouse, or the like; an output unit 507, such as various types of displays, speakers, and the like; a storage unit 508, such as a magnetic disk, an optical disk, and the like; and a communication unit 509, such as a network card, a modem, a wireless communication transceiver, and the like. The communication unit 509 allows the device 500 to exchange information/data with other devices through a computer network such as the Internet and/or various telecommunication networks.

The various processes and processing described above, such as the methods 200, 300, and 400, may be performed by the central processing unit 501. For example, in some embodiments, the methods 200, 300 and 400 may be implemented as a computer software program, which is tangibly embodied in a machine-readable medium, such as the storage unit 508. In some embodiments, a part or all of the computer program may be loaded and/or installed on the device 500 via the ROM 502 and/or the communication unit 509. When the computer program is loaded into the RAM 503 and executed by the CPU 501, one or more actions of the methods 200, 300 and 400 described above may be executed.

The present disclosure may be a method, an apparatus, a system and/or a computer program product. The computer program product may include a computer-readable storage medium carrying a computer-readable program instruction for performing various aspects of the present disclosure.

The computer-readable storage medium may be a tangible device that can hold and store an instruction used by an instruction executing device. The computer-readable storage medium may be, for example, but not limited to, an electrical storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a random access memory (RAM), a read-only memory (ROM), an erasable programmable read-only memory (ROM) (EPROM or flash memory), a static random access memory (SRAM), a portable compact disc read-only memory (CD-ROM), a digital versatile disc (DVD), a memory stick, a floppy disc, a mechanical coding device, such as a punch card or a bulge structure in a groove on which an instruction is stored, or any suitable combination of the above. The computer-readable storage medium used here is not interpreted as instantaneous signals, such as radio waves or other freely propagated electromagnetic waves, electromagnetic waves propagated through waveguides or other transmission media (for example, light pulses through fiber optic cables), or electrical signals transmitted through electric wires.

The computer-readable storage medium used here may be downloaded from a computer-readable storage medium to various computing/processing devices, or downloaded to an external computer or an external storage device through a network, such as the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives a computer-readable program instruction from the network and forwards the computer-readable program instruction for storage in the computer-readable storage medium in each computing/processing device.

The computer program instruction for performing operations of the present disclosure may be an assembly instruction, an Instruction Set Architecture (ISA) instruction, a machine instruction, a machine-related instruction, a microcode, a firmware instruction, status setting data, or a source code or an object code written in one programming language or any combination of more programming languages. The programming languages include object-oriented programming languages such as Smalltalk, C++, and conventional procedural programming languages such as "C or similar programming languages. The computer-readable program instructions may be executed entirely on a user computer, partially executed on the user computer, executed as an independent software package, partially executed on the user computer and partially executed on a remote computer, or entirely executed on the remote computer or a server. In a case involving a remote computer, the remote computer can be connected to the user computer via any kind of network, including a Local Area Network (LAN) or a Wide Area Network (WAN), or can be connected to an external computer (e.g., connected via the Internet using an Internet service provider). In some embodiments, electronic circuits, such as a programmable logic circuit, a field programmable gate array (FPGA), or a programmable logic array (PLA), can be customized by utilizing the status information of the computer-readable program instruction. The electronic circuits can execute the computer-readable program instruction, thereby implementing various aspects of the present disclosure.

Various aspects of the present disclosure have been described with reference to the flow charts and/or block diagrams of the method, apparatus (system), and computer program products according to the embodiments of the present disclosure. It should be understood that each block of the flow chart and/or block diagram and combinations of the blocks in the flow chart and/or block diagram can be implemented by computer-readable program instructions.

These computer-readable program instructions may be provided to a general purpose computer, a special purpose computer, or a processing unit of other programmable data processing device to produce a machine for the instructions executed by the computer or the processing unit of other programmable data processing device to generate an apparatus for implementing the functions/actions specified in one or more blocks of the flow chart and/or block diagram. These computer-readable program instructions may also be stored in a computer-readable storage medium that can guide the computer, the programmable data processing device and/or other apparatus to work in a given manner, so that the computer readable medium stored with instructions comprises a product including an instruction that implements various aspects of the functions/actions specified in one or more blocks of the flow chart and/or block diagram.

The computer-readable program instructions may also be loaded to a computer, other programmable data processing device, or other device, so that a series of operating steps are executed on the computer, the other programmable data, or the other device to produce computer-implemented processes, so that the instructions executed in the programmable data processing device, or the other device implements the functions/actions specified in one or more blocks of the flow chart and/or block diagram.

The flow charts and block diagrams in the drawings show the possibly implemented architectures, functions, and operations of the system, the method, and the computer program product according to multiple embodiments of the present disclosure. In this regard, each block in the flow chart or block diagram may represent one module, one program segment, or a part of an instruction. The module, the program segment, or the part of an instruction contains one or more executable instructions for implementing specified logical functions. In some alternative implementations, the functions noted in the blocks may also occur in a different order from those noted in the drawings. For example, two consecutive blocks may actually be executed in substantially parallel, and sometimes may be executed in reverse order, depending on the functions involved. It should also be noted that each block in the block diagrams and/or flow charts, and combinations of the blocks in the block diagrams and/or flow charts, may be implemented with dedicated hardware-based systems that perform specified functions or actions, or may be implemented with combinations of dedicated hardware and computer instructions.

Various embodiments of the present disclosure have been described above, and the above description is exemplary, not exhaustive, and is not limited to the disclosed embodiments. Many modifications and variations will be apparent to those of ordinary skills in the art without departing from the scope and spirit of the illustrated embodiments. Terms used herein are selected to best explain the principles and practical applications of various embodiments or technical improvements to technologies in the market, or to enable other people of ordinary skills in the art to understand various embodiments disclosed herein.

The invention claimed is:

1. A method for managing data, comprising:
   acquiring data related to a schedule of a user at a mobile terminal device;
   identifying the data to obtain a travel time related to the user and location information corresponding to the travel time; and
   sending a transmission request related to the travel time and the location information to a server, so that the server sends the travel time and the location information to a vehicle related to an identification of user, and the vehicle initiates automatic navigation based on the travel time and the location information, wherein the transmission request at least comprises the identification of user, the travel time and the location information;
   wherein the step of acquiring the data related to the schedule of the user at the mobile terminal device comprises:
   acquiring image data related to the schedule of the user, wherein the image data is acquired from at least one of the mobile terminal devices and the server; and/or
   acquiring a short message on the mobile terminal device;
   wherein the method further comprises:
   using different markers to identify travelled location information and untraveled location information.

2. The method according to claim 1, wherein the step of acquiring the data related to the schedule of the user at the mobile terminal device further comprises:
   acquiring voice data input by the user at the mobile terminal device.

3. The method according to claim 1, further comprising a step of storing the location information based on the travel time.

4. The method according to claim 3, wherein the step of storing the location information based on the travel time comprises:
   based on the travel time, storing the location information in a calendar.

5. The method according to claim 1, further comprising:
   in response to confirming that a current time is matched with the travel time, displaying a prompt message related to the location information to the user.

6. The method according to claim 5, wherein the prompt message comprises information of automatic navigation or information of car hailing service.

7. The method according to claim 1, further comprising:
   in response to receiving a first query request comprising a query time, determining whether the location information corresponding to the query time exists; and
   in response to determining that the location information related to the query time exists, displaying the location information.

8. The method according to claim 1, further comprising:
   in response to receiving a second query request comprising query location information, determining whether the travel time related to the query location information exists; and
   in response to determining that the travel time related to the query location information exists, displaying the travel time.

9. A method for managing data, comprising:
   receiving a transmission request related to a travel time and location information of a user from a mobile terminal device at a server, wherein the transmission request at least comprises an identification of a user, the travel time, and the location information;

determining whether the user corresponding to the identification of user exists based on the identification of user;

in response to determining that the user corresponding to the identification of user exists, storing the travel time and the location information; and in response to receiving a connection request comprising the identification of user from a vehicle, sending the travel time and the location information related to the identification of user to the vehicle, so that the vehicle initiates automatic navigation based on the travel time and the location information.

10. A method for managing data, comprising:

sending a connection request comprising an identification of user to a server at a vehicle;

receiving a travel time and location information corresponding to the identification of user from the server; and initiating automatic navigation related to the location information based on the travel time.

11. The method according to claim 10, wherein the step of initiating the automatic navigation related to the location information comprises:

in response to confirming that a current time is matched with the travel time, generating information for navigation based on a current location of the vehicle and location information corresponding to the travel time.

12. An electronic device for managing data, wherein the electronic device comprises:

a processor; and a memory storing a computer program, wherein the processor runs the computer program instruction in the memory to control the electronic device to execute the steps of the method according to claim 1.

13. An electronic device for managing data, wherein the electronic device comprises:

a processor; and a memory storing a computer program, wherein the processor runs the computer program instruction in the memory to control the electronic device to execute the steps of the method according to claim 9.

14. An electronic device for managing data, wherein the electronic device comprises:

a processor; and a memory storing a computer program, wherein the processor runs the computer program instruction in the memory to control the electronic device to execute the steps of the method according to claim 10.

15. A nonvolatile computer-readable storage medium storing a computer program thereon, wherein the program, when executed by a processor, implements the method according to claim 1.

16. A nonvolatile computer-readable storage medium storing a computer program thereon, wherein the program, when executed by a processor, implements the method according to claim 9.

17. A nonvolatile computer readable medium storing a computer program thereon, wherein the computer program, when executed by a processor, implements the method according to claim 10.

* * * * *